(12) United States Patent
Chen

(10) Patent No.: US 10,311,622 B2
(45) Date of Patent: Jun. 4, 2019

(54) VIRTUAL REALITY DEVICE AND METHOD FOR VIRTUAL REALITY

(71) Applicant: HTC Corporation, Taoyuan (TW)

(72) Inventor: Yi-Hsiu Chen, Seattle, WA (US)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 15/465,761

(22) Filed: Mar. 22, 2017

(65) Prior Publication Data

US 2017/0287195 A1 Oct. 5, 2017

Related U.S. Application Data

(60) Provisional application No. 62/314,413, filed on Mar. 29, 2016.

(51) Int. Cl.
| | |
|---|---|
| *G06F 3/01* | (2006.01) |
| *G06T 11/60* | (2006.01) |
| *G06T 13/40* | (2011.01) |
| *G06T 15/20* | (2011.01) |
| *G06F 3/0481* | (2013.01) |

(52) U.S. Cl.
CPC ............. *G06T 13/40* (2013.01); *G06F 3/011* (2013.01); *G06F 3/04815* (2013.01); *G06T 11/60* (2013.01); *G06T 15/20* (2013.01)

(58) Field of Classification Search
CPC .... G06T 19/006; G06F 3/04815; A63F 13/52; H04L 67/22
See application file for complete search history.

(56) References Cited

U.S. PATENT DOCUMENTS

| | | | |
|---|---|---|---|
| 2005/0086612 A1* | 4/2005 | Gettman | G06F 3/04815 |
| | | | 715/848 |
| 2009/0225074 A1* | 9/2009 | Bates | G06T 15/20 |
| | | | 345/419 |
| 2011/0314381 A1* | 12/2011 | Fuller | G06F 3/017 |
| | | | 715/727 |
| 2012/0028706 A1* | 2/2012 | Raitt | A63F 13/10 |
| | | | 463/31 |

FOREIGN PATENT DOCUMENTS

| | | |
|---|---|---|
| CN | 102947774 A | 2/2013 |
| TW | 200745734 A | 12/2007 |

OTHER PUBLICATIONS

Office Action issued in corresponding Taiwan patent application dated Aug. 7, 2018.

* cited by examiner

*Primary Examiner* — Haixia Du
(74) *Attorney, Agent, or Firm* — McClure, Qualey & Rodack, LLP

(57) ABSTRACT

A method for virtual reality (VR) includes displaying a VR event in a view of a first VR position in a VR environment in a first period, wherein a user's VR avatar is at the first VR position in the first period; recording the VR event; and redisplaying the recorded VR event in a view of a second VR position in the VR environment in a second period.

18 Claims, 7 Drawing Sheets

VIRTUAL REALITY DEVICE AND METHOD FOR VIRTUAL REALITY

RELATED APPLICATIONS

This application claims priority to Application Ser. No. 62/314,413 filed Mar. 29, 2016, which is herein incorporated by reference.

BACKGROUND

Technical Field

The present disclosure relates to an electronic device and a method. More particularly, the present disclosure relates to a virtual reality device and a method for virtual reality.

Description of Related Art

With advances in electronic technology, virtual reality (VR) systems are being increasingly used.

A VR system may provide many VR functions to a user to allow the user to explore a VR environment. Hence, how to design VR functions is an important area of research in this field.

SUMMARY

One aspect of the present disclosure is related to a method for virtual reality (VR). In accordance with one embodiment of the present disclosure, the method includes displaying a VR event in a view of a first VR position in a VR environment in a first period, wherein a user's VR avatar is at the first VR position in the first period; recording the VR event; and redisplaying the recorded VR event in a view of a second VR position in the VR environment in a second period.

In accordance with one embodiment of the present disclosure, the user's VR avatar is at the second VR position in the second period.

In accordance with one embodiment of the present disclosure, the method further includes recording one or more motions of a VR object in the VR event in the first period, and redisplaying the recorded motions of the VR object in the VR event in the view of the second VR position in the second period.

In accordance with one embodiment of the present disclosure, the method further includes changing at least one parameter of a VR object in the recorded VR event corresponding to a movement of the user's VR avatar in the second period.

In accordance with one embodiment of the present disclosure, the method further includes recording one or more motions of the user's VR avatar at the first VR position in the VR event in the first period, and redisplaying the recorded motions of the user's VR avatar in the VR event in the view of the second VR position in the second period.

In accordance with one embodiment of the present disclosure, the method further includes changing at least one parameter of the user's VR avatar in the recorded VR event corresponding to a movement of the user's VR avatar in the second period.

In accordance with one embodiment of the present disclosure, the method further includes freezing a moment of the redisplayed VR event in the second period, detecting a moving operation corresponding to a third VR position in the frozen moment of the redisplayed VR event, and displaying the frozen moment of the redisplayed VR event in a view of the third VR position in the VR environment.

In accordance with one embodiment of the present disclosure, the method further includes capturing a moment of the redisplayed VR event in the second period that stores information of the moment of the redisplayed VR event, retrieving the stored information of corresponding to the captured moment of the redisplayed VR event, detecting a moving operation corresponding to a third VR position in the captured moment of the redisplayed VR event, and displaying the captured moment of the redisplayed VR event in a view of the third VR position in the VR environment.

Another aspect of the present disclosure is related to a virtual reality (VR) device. In accordance with one embodiment of the present disclosure, the VR includes a VR display device, one or more processing components electrically connected to the VR display device, memory electrically connected to the one or more processing components, and one or more programs. The one or more programs are stored in the memory and configured to be executed by the one or more processing components. The one or more programs include instructions for controlling the VR display device for displaying a VR event in a view of a first VR position in a VR environment in a first period, wherein a user's VR avatar is at the first VR position in the first period; recording the VR event; and controlling the VR display device for redisplaying the recorded VR event in a view of a second VR position in the VR environment in a second period.

In accordance with one embodiment of the present disclosure, wherein the user's VR avatar is at the second VR position in the second period.

In accordance with one embodiment of the present disclosure, the VR device further includes instructions for recording one or more motions of a VR object in the VR event in the first period, and controlling the VR display device for redisplaying the recorded motions of the VR object in the VR event in the view of the second VR position in the second period.

In accordance with one embodiment of the present disclosure, the VR device further includes instructions for changing at least one parameter of a VR object in the recorded VR event corresponding to a movement of the user's VR avatar in the second period.

In accordance with one embodiment of the present disclosure, the VR device further includes instructions for recording one or more motions of the user's VR avatar at the first VR position in the VR event in the first period, and controlling the VR display device for redisplaying the recorded motions of the user's VR avatar in the VR event in the view of the second VR position in the second period.

In accordance with one embodiment of the present disclosure, the VR device further includes instructions for changing at least one parameter of the user's VR avatar in the recorded VR event corresponding to a movement of the user's VR avatar in the second period.

In accordance with one embodiment of the present disclosure, the VR device further includes instructions for freezing a moment of the redisplayed VR event in the second period, detecting a moving operation corresponding to a third VR position in the frozen moment of the redisplayed VR event, and controlling the VR display device for displaying the frozen moment of the redisplayed VR event in a view of the third VR position in the VR environment.

In accordance with one embodiment of the present disclosure, the VR device further includes instructions for capturing a moment of the redisplayed VR event in the second period that stores information of the moment of the redisplayed VR event, retrieving the stored information of corresponding to the captured moment of the redisplayed VR event, detecting a moving operation corresponding to a third VR position in the captured moment of the redisplayed VR event, and controlling the VR display device for displaying the captured moment of the redisplayed VR event in a view of the third VR position in the VR environment.

Another aspect of the present disclosure is related to a virtual reality (VR) device. In accordance with one embodiment of the present disclosure, the VR includes a VR display device, one or more processing components electrically connected to the VR display device, memory electrically connected to the one or more processing components, and one or more programs. The one or more programs are stored in the memory and configured to be executed by the one or more processing components. The one or more programs include instructions for controlling the VR display device for displaying a moment of a VR environment in a view of a first VR position in the VR environment, wherein a user's VR avatar is at the first VR position in the VR environment at the moment; detecting a moving operation corresponding to a second VR position in the VR environment; and controlling the VR display device for displaying the moment of the VR environment in a view of a second VR position in the VR environment.

In accordance with one embodiment of the present disclosure, the VR device further includes instructions for moving the user's VR avatar or a ghost of the user's VR avatar in the moment of the VR environment in response to the moving operation, and changing one or more of parameters of a VR object in the moment of the VR environment in response to a movement of the user's VR avatar or the ghost of the user's VR avatar.

In accordance with one embodiment of the present disclosure, the VR device further includes instructions for freezing the VR environment at the moment before detecting the moving operation, and unfreezing the VR environment after displaying the moment of the frozen VR environment in the view of the second VR position.

In accordance with one embodiment of the present disclosure, the VR device further includes instructions for capturing the moment of the VR environment that stores information of the VR environment corresponding to the moment, and retrieving the stored information of the VR environment corresponding to the moment to display the moment of the VR environment in the view of the first VR position before detecting the moving operation.

Through the operations of one embodiment described above, a user can watch a past VR event again in a view of a different VR position.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
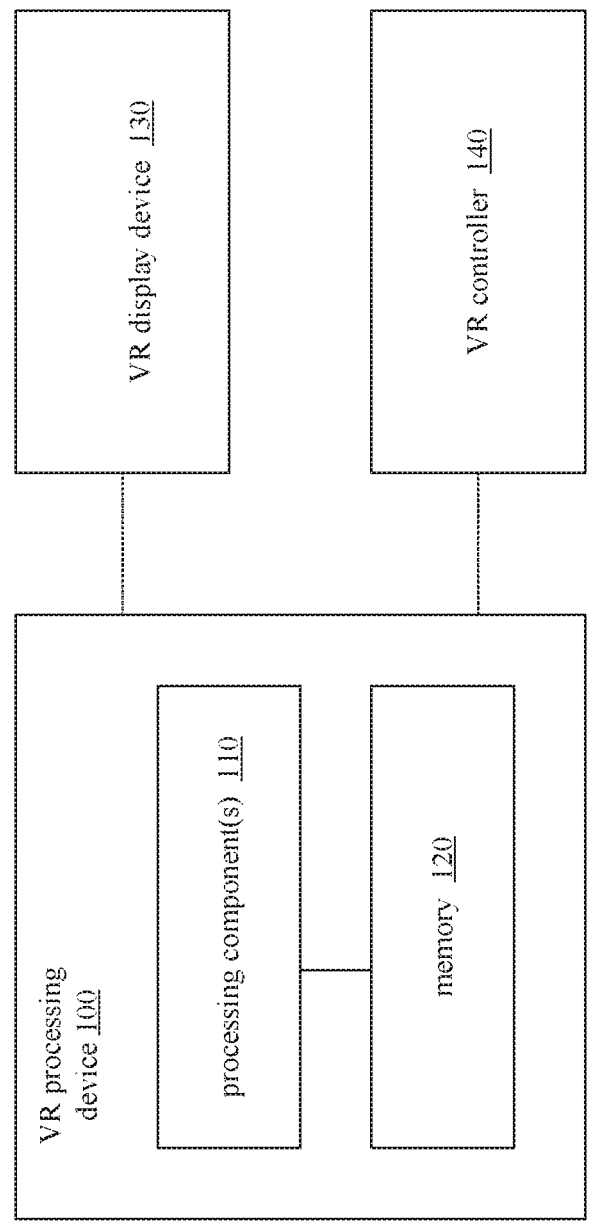
FIG. 1 is a schematic block diagram of a virtual reality (VR) system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for"

performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of a virtual reality (VR) system 10 in accordance with one embodiment of the present disclosure. In this embodiment, the VR system 10 includes a VR processing device 100, a VR display device 130, and a VR controller 140. In one embodiment, the VR processing device 100 may electrically connected to the VR display device 130 and the VR controller 140 via wired or wireless connection. In one embodiment, the VR processing device 100 may be integrated with the VR display device 130 or the VR controller 140, and the present disclosure is not limited to the embodiment described herein. In one embodiment, the VR system 10 may include more than one VR controllers. In one embodiment, the VR controller 140 may be omitted. In such a configuration, the VR system 10 may further include a detector to detect movements of the user.

In one embodiment, the VR system 10 may further includes base stations (not shown) for positioning the VR display device 130 and/or the VR controller 140 and/or detecting tilt angles (e.g., rotating angles or orientations) of the VR display device 130 and/or the VR controller 140. However, other positioning methods and/or orientation detecting methods are within the contemplated scope of the present disclosure.

In one embodiment, the VR processing device 100 includes one or more processing components 110 and a memory 120. In this embodiment, the processing component 110 is electrically connected to the memory 120. In one embodiment, the VR processing device 100 may further include signal transceivers for transmitting and receiving signals between the VR processing device 100 and the VR display device 130 and/or signals between the VR processing device 100 and the VR controller 140.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains. The VR display device 130 can be realized by, for example, a display, such as a liquid crystal display, or an active matrix organic light emitting display (AMOLED), but is not limited in this regard. The VR controller 140 can be realized by, for example, a handheld controller, such as a controller for Vive or a controller for Gear, but is not limited in this regard.

In one embodiment, the one or more processing components 110 may run or execute various software programs and/or sets of instructions stored in memory 120 to perform various functions for the VR processing device 100 and to process data.

In one embodiment, the one or more processing components 110 control the VR display device 130 to display a VR environment in a view of a first VR position in the VR environment. In one embodiment, a user's VR avatar may be at the first VR position in the VR environment. In one embodiment, the VR scene of the VR environment displayed by the VR display device 130 corresponds to the orientation and the position of the user's VR avatar (i.e., the orientation and the position of the VR display device 130). In one embodiment, the VR environment may have one or more VR objects therein.

In one embodiment, the one or more processing components 110 may detect a freezing operation at a certain moment (e.g., at the $15^{th}$ second). In one embodiment, the freezing operation may be performed by the VR controller 140 (e.g., a click of the VR controller 140 aiming at a freeze button) or a freeze gesture of the user (e.g., the user clenches his/her fists).

In one embodiment, in response to the freeze operation, the one or more processing components 110 freeze the VR environment at the certain moment (e.g., at the $15^{th}$ second), so that all of the one or more VR objects in the VR environment and the background of the VR environment are frozen and stop their motions or activities at the certain moment (e.g., the $15^{th}$ second). At this time, the one or more processing components 110 control the VR display device 130 to display this frozen moment of the VR environment in the view of the first VR position in the VR environment.

In one embodiment, after the VR environment is frozen, the one or more processing components 110 may detect a moving operation corresponding to a second VR position in the VR environment (e.g., at the $20^{th}$ second). In one embodiment, the moving operation may be performed by the VR controller 140 (e.g., a click of the VR controller 140 aiming at the second VR position) or a moving operation of the user (e.g., the user steps to a place corresponding to the second VR position).

In one embodiment, in response to the moving operation corresponding to the second position, the one or more processing components 110 control the VR display device 130 to display the frozen VR environment (e.g., frozen at the $15^{th}$ second) in a view of the second VR position in the VR environment.

Subsequently (e.g., at the $25^{th}$ second), the one or more processing components 110 may detect an unfreezing operation. In one embodiment, the unfreezing operation may be performed by the VR controller 140 (e.g., a click of the VR controller 140 aiming at an unfreeze button) or a unfreeze gesture of the user (e.g., the user looses his/her fists).

In one embodiment, in response to the unfreeze operation, the one or more processing components 110 unfreeze the VR environment so that all of the one or more VR objects in the VR environment the background of the VR environment are unfrozen and continue their motions or activities. In one embodiment, the one or more processing components 110 may move the user's VR avatar in response to the moving operation during the VR environment is frozen. In such an embodiment, the user's VR avatar is at the place where the user's VR avatar is moved to during the VR environment is frozen (e.g., the second VR position) while the VR environment is unfrozen.

In an alternative embodiment, the one or more processing components 110 may merely move a ghost of the user's VR avatar in response to the moving operation during the VR environment is frozen, in which the ghost of the user's VR avatar indicates a virtual character controlled by the user that can move around during the VR environment is frozen. In such an embodiment, the VR scene of the VR environment displayed by the VR display device 130 corresponds to the orientation and the position of the ghost of the user's VR avatar (i.e., the orientation and the position of the VR display device 130) during the VR environment is frozen. In such an embodiment, the ghost of the user's VR avatar disappears while the VR environment is unfrozen, and the VR display device 130 displays the VR environment corresponding to the orientation and the position of the original user's VR avatar again.

Figure 2:
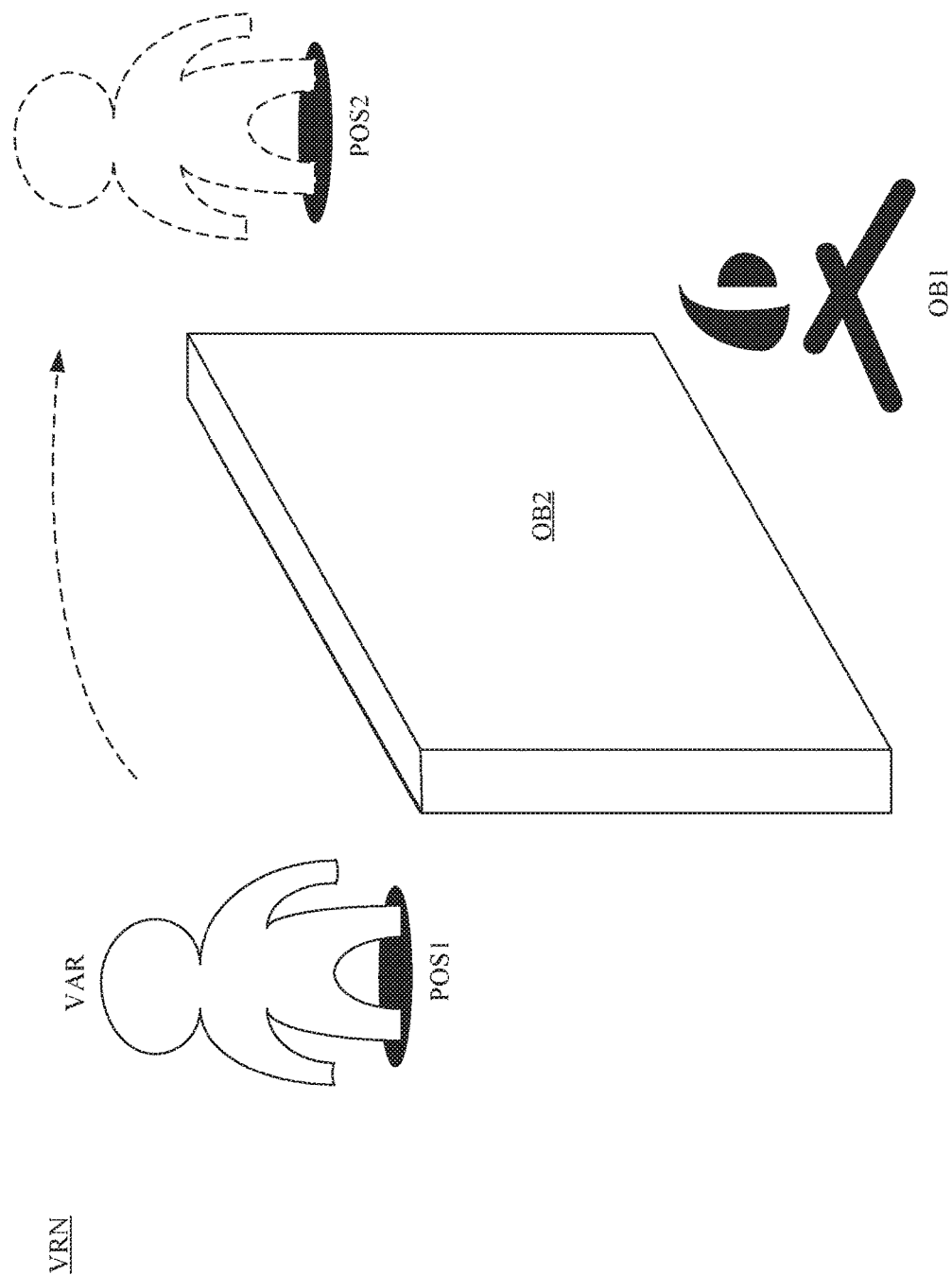
FIG. 2 illustrates an illustrative example of the VR system in accordance with one embodiment of the present disclosure.

FIG. 2 illustrates an illustrative example of the VR system in accordance with one embodiment of the present disclosure. In this example, the VR environment VRN has a first VR object OB1 (e.g., a campfire) and a second VR object OB1 (e.g., a wall) therein. The user's VR avatar VAR is at VR position POS1 in the VR environment VRN. The one or more processing components 110 control the VR display device 130 to display the VR environment VRN in a view of the position POS1. Since the VR object OB1 is shielded by the VR object OB2, the object OB1 is not presented on the VR display device 130.

In this example, the user may freeze the VR environment VRN. During the VR environment VRN is frozen, the user can move his/her VR avatar or a ghost of his/her VR avatar to the VR position POS2, so that the VR display device 130 can display the VR environment VRN in a view of the position POS2. At this time, since the VR object OB1 exposes from the VR object OB2, the object OB1 can be presented on the VR display device 130.

Through the operations described above, the user can explore all of the VR environment at a certain moment by freezing the VR environment at that moment.

In one embodiment, during the VR environment is frozen, the one or more processing components 110 may change one or more parameters of one or more of the VR objects in the frozen VR environment in response to a movement of the user's VR avatar or the ghost of the user's VR avatar. In one embodiment, the movement may be performed by the VR controller 140 (e.g., a click of the VR controller 140 aiming at a VR object) or a motion of the user (e.g., the user stretches out his/her hand to a VR object). In one embodiment, the one or more parameters may include one or more position parameters, one or more orientation parameters, one or more motion parameters, and/or one or more statue parameters, but are not limited in this regard.

Figure 3:
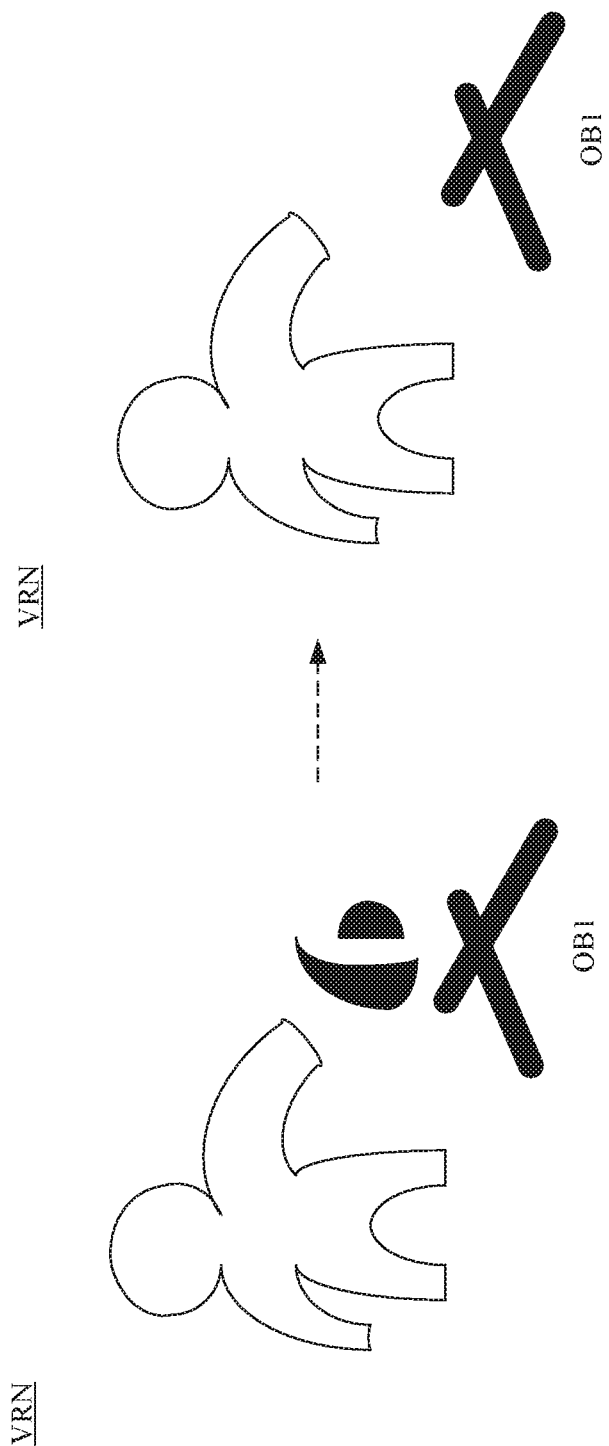
FIGS. 3A and 3B illustrate an illustrative example of the VR system in accordance with one embodiment of the present disclosure.

FIGS. 3A and 3B illustrate an illustrative example of the VR system in accordance with one embodiment of the present disclosure. In this example, the user may click at the frozen object OB1, so that the user's avatar or the ghost of the user's avatar perform a movement corresponding to the frozen object OB1, so as to change one or more parameters corresponding to the frozen object OB1 (e.g., change a corresponding statue parameter from "light up" to "extinguished").

In one embodiment, during the VR environment is frozen, the one or more processing components 110 may change one or more parameters of one or more of the user's VR avatar in the frozen VR environment in response to a movement of the ghost of the user's VR avatar. In one embodiment, the movement may be performed by the VR controller 140 (e.g., a click of the VR controller 140 aiming at the user's VR avatar) or a motion of the user (e.g., the user stretches out his/her hand to the user's VR avatar). In one embodiment, the one or more parameters may include one or more position parameters, one or more orientation parameters, one or more motion parameters, and/or one or more statue parameters, but are not limited in this regard.

Figure 4:
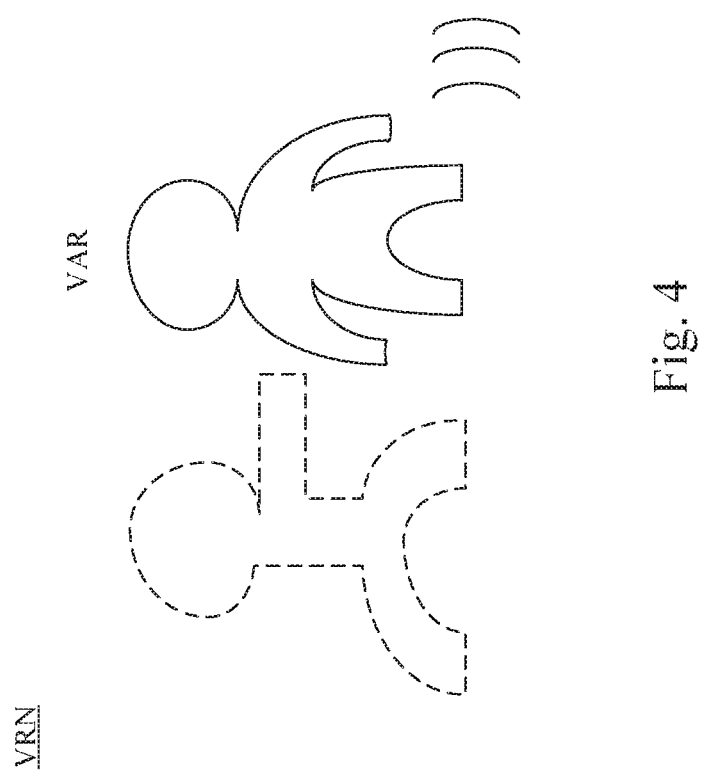
FIG. 4 illustrates an illustrative example of the VR system in accordance with one embodiment of the present disclosure.

FIG. 4 illustrates an illustrative example of the VR system in accordance with one embodiment of the present disclosure. In this example, the user may click at the frozen user's VR avatar VAR, so that the ghost of the user's avatar perform a movement corresponding to the frozen user's VR avatar VAR, so as to change one or more parameters corresponding to the frozen user's VR avatar VAR (e.g., change a corresponding position parameter).

In one embodiment of the present disclosure, after the one or more processing components 110 control the VR display device 130 to display the VR environment in the view of a first VR position in the VR environment, the one or more processing components 110 can detect a capturing operation at a certain moment (e.g., at the $15^{th}$ second). In one embodiment, the capturing operation may be performed by the VR controller 140 (e.g., a click of the VR controller 140 aiming at a capturing button) or a capturing gesture of the user (e.g., the user clenches his/her fists).

In one embodiment, in response to the capturing operation, the one or more processing components 110 capture the VR environment at the certain moment (e.g., the $15^{th}$ second) that store information of the VR environment corresponding to this certain moment to the memory 120. In one embodiment, the stored information may include information of the background of the VR environment corresponding to this certain moment, information of the one or more VR objects in the VR environment corresponding to this certain moment, and/or information of the user's VR avatar corresponding to this certain moment. In one embodiment, the VR environment is captured as a global VR image. In one embodiment, after the global VR image is captured, the one or more processing components 110 can continuously perform the VR application corresponding to the VR environment and/or capture another global VR image.

In one embodiment, after the global VR image is captured (e.g., at the $35^{th}$ second), the one or more processing components 110 can retrieve the information of the VR environment captured at the certain moment (e.g., the $15^{th}$ second) to display that moment of the VR environment in the view of the first VR position according to the retrieved information.

Subsequently (e.g., at the $40^{th}$ second), the one or more processing components 110 may detect a moving operation corresponding to a second VR position in the VR environment. Details of the moving operation can be ascertained with reference to the paragraphs above, and a description in this regard will not be repeated herein.

In response to the moving operation corresponding to the second position, the one or more processing components 110 control the VR display device 130 to display the captured moment of the VR environment (e.g., captured at the $15^{th}$ second) in a view of the second VR position in the VR environment.

That is, instead of merely a 2D image, the global VR image is a certain moment of the VR environment corresponding to the capturing time point that the user's VR avatar or the ghost of the user's VR avatar can move around therein.

In one embodiment, the one or more processing components 110 may move the user's VR avatar in response to the moving operation in the captured moment of the VR environment (i.e., in the global VR image). In an alternative embodiment, the one or more processing components 110 may merely move the ghost of the user's VR avatar in response to the moving operation in the captured moment of the VR environment. In such an embodiment, the VR scene of the VR environment displayed by the VR display device 130 corresponds to the orientation and the position of the ghost of the user's VR avatar in the captured moment of the VR environment. Details of the ghost of the user's VR avatar can be ascertained with reference to the paragraphs above, and a description in this regard will not be repeated herein.

In one embodiment, within the certain moment of the VR environment, the one or more processing components 110 may change one or more parameters of one or more of the VR objects in the captured moment of the VR environment in response to a movement of the user's VR avatar or the ghost of the user's VR avatar. Many aspects in this regard can be ascertained with reference to the paragraphs above, and a description in this regard will not be repeated herein.

In one embodiment, within the certain moment of the VR environment, the one or more processing components 110 may change one or more parameters of the user's VR avatar in the captured moment of the VR environment in response to a movement of the user's VR avatar or the ghost of the user's VR avatar. Many aspects in this regard can be ascertained with reference to the paragraphs above, and a description in this regard will not be repeated herein.

Through the operations described above, a moment of the VR environment can be captured and redisplayed.

In one embodiment of the present disclosure, the one or more processing components 110 control the VR display device 130 to display a VR event in a view of a first VR position in a VR environment in a first period (e.g., $5^{th}$-$15^{th}$ seconds). In one embodiment, a user's VR avatar may be at the first VR position in the VR environment. In one embodiment, the VR scene of the VR environment displayed by the VR display device 130 corresponds to the orientation and the position of the user's VR avatar (i.e., the orientation and the position of the VR display device 130). In one embodiment, the VR environment may have one or more VR objects therein. In one embodiment, the VR event indicates one or more motions of the user's VR avatar, one or more activities of the background of the VR environment, and/or one or more motions of the one or more VR objects in the VR environment.

In one embodiment, the one or more processing components 110 record the VR event that store information of the VR event in the VR environment during the first period to the memory 120. In one embodiment, the stored information may include information of the activities of the background of the VR environment in the VR event during the first period, information of the one or more motions of the one or more VR objects in the VR environment in the VR event during the first period, and/or information of the one or more motions of the user's VR avatar in the VR event during the first period.

In one embodiment, after the VR event is recorded, the one or more processing components 110 may detect a redisplay operation corresponding to the recorded VR event (e.g., at the $25^{th}$ second). In one embodiment, the redisplay operation may be performed by the VR controller 140 (e.g., a click of the VR controller 140 aiming at a redisplay button corresponding to the recorded VR event) or a redisplay operation of the user (e.g., the user stretches out his/her hand to a redisplay button corresponding to the recorded VR event).

In one embodiment, in response to the redisplay operation corresponding to the recorded VR event, the one or more processing components 110 control the VR display device 130 to redisplay the recorded VR event in a view of a second VR position in the VR environment in a second period (e.g., in the $25^{th}$-$30^{th}$ seconds). In one embodiment, the redisplayed VR event includes the recorded activities of the background of the VR environment, the recorded one or more motions of the one or more VR objects in the VR environment, and/or the recorded one or more motions of the user's VR avatar in the VR event during the first period.

In one embodiment, in the second period (e.g., in the $25^{th}$-$30^{th}$ seconds), the present user's VR avatar may be at the second VR position different from the first VR position. In addition, in the same time, the VR display device 130 may redisplay the past user's VR avatar at the first VR position in the first period in the view of the second VR position.

In one embodiment, during the second period (e.g., in the $25^{th}$-$30^{th}$ seconds), the one or more processing components 110 may detect a moving operation corresponding to a third VR position different from the second VR position in the VR environment (e.g., at the $27^{th}$ second). In one embodiment, the moving operation may be performed by the VR controller 140 (e.g., a click of the VR controller 140 aiming at the third VR position) or a moving operation of the user (e.g., the user steps to a place corresponding to the third VR position).

In one embodiment, in response to the moving operation corresponding to the third position, the one or more processing components 110 control the VR display device 130 to display the recorded VR event in a view of the third VR position in the VR environment. In one embodiment, the one or more processing components 110 moves the user's VR avatar to the third VR position in the VR environment in response to the moving operation corresponding to the third position. That is, in the second period (e.g., in the $25^{th}$-$30^{th}$ seconds), the user's VR avatar can move around to watch the redisplayed VR event at different places.

In one embodiment, in the second period (e.g., in the $25^{th}$-$30^{th}$ seconds), the one or more processing components 110 may freeze the VR environment at the certain moment (e.g., the $27^{th}$ second), so that all of the redisplayed VR objects in the VR environment, the redisplayed background of the VR environment, and the redisplayed user's VR avatar are frozen at the certain moment (e.g., the $27^{th}$ second). Details in this regard can be ascertained with reference to the paragraphs above, and a description in this regard will not be repeated herein.

In one embodiment, in the second period (e.g., in the $25^{th}$-$30^{th}$ seconds), the one or more processing components 110 may capture the VR environment at the certain moment (e.g., the $27^{th}$ second) that store information of the VR environment corresponding to this certain time point to the memory 120. In one embodiment, the stored information may include information of the redisplayed background of the VR environment corresponding to this certain moment, information of the redisplayed one or more VR objects in the VR environment corresponding to this certain moment, and/or information of the redisplayed user's VR avatar, and/or the present user's VR avatar corresponding to this certain moment. In one embodiment, the VR environment is captured as a global VR image.

In one embodiment, after the global VR image is captured (e.g., at the $35^{th}$ second), the one or more processing components 110 can retrieve the information of the VR environment captured at the certain time point (e.g., the $27^{th}$ second) to display that moment of the VR environment according to the retrieved information.

It should be noted that, details of the capture operation in the second period described above can be ascertained with reference to the paragraphs above, and a description in this regard will not be repeated herein.

In one embodiment, in the second period (e.g., in the $25^{th}$-$30^{th}$ seconds), under an observer mode, movements of the user's VR avatar do not affect the redisplayed VR event. In one embodiment, in the second period (e.g., in the $25^{th}$-$30^{th}$ seconds), under the observer mode, movements of the user's VR avatar do not change any parameter of the one or more of the redisplayed VR objects and/or the redisplayed user's VR avatar recorded in the first period.

Similarly, in one embodiment, in the second period (e.g., in the $25^{th}$-$30^{th}$ seconds), under the observer mode, movements in the redisplayed VR event do not affect the redisplayed VR event. In one embodiment, in the second period (e.g., in the $25^{th}$-$30^{th}$ seconds), under the observer mode, movements of the one or more of redisplayed VR objects and/or the redisplayed user's VR avatar recorded in the first period do not change any parameter of the user's VR avatar.

In an alternative embodiment, in the second period (e.g., in the $25^{th}$-$30^{th}$ seconds), under an interacting mode, movements of the user's VR avatar change one or more parameters of the one or more of the redisplayed VR objects and/or the redisplayed user's VR avatar recorded in the first period. Similarly, in one embodiment, in the second period (e.g., in the $25^{th}$-$30^{th}$ seconds), under the interacting mode, a motion of the one or more of the redisplayed VR objects and/or a motion of the redisplayed user's VR avatar recorded in the first period change one or more parameters of user's VR avatar.

In one embodiment, the one or more parameters may include one or more position parameters, one or more orientation parameters, one or more motion parameters, and/or one or more statue parameters, but are not limited in this regard.

In one embodiment, the one or more processing components 110 can enable the observer mode or the interacting mode according to a default setting or a user's selection. In one embodiment, the user's selection may be performed by the VR controller 140 (e.g., a click of the VR controller 140 aiming at an observer mode button or an interacting mode button) or a selecting operation of the user (e.g., the user stretches out his/her hand to an observer mode button or an interacting mode button).

Figure 5:
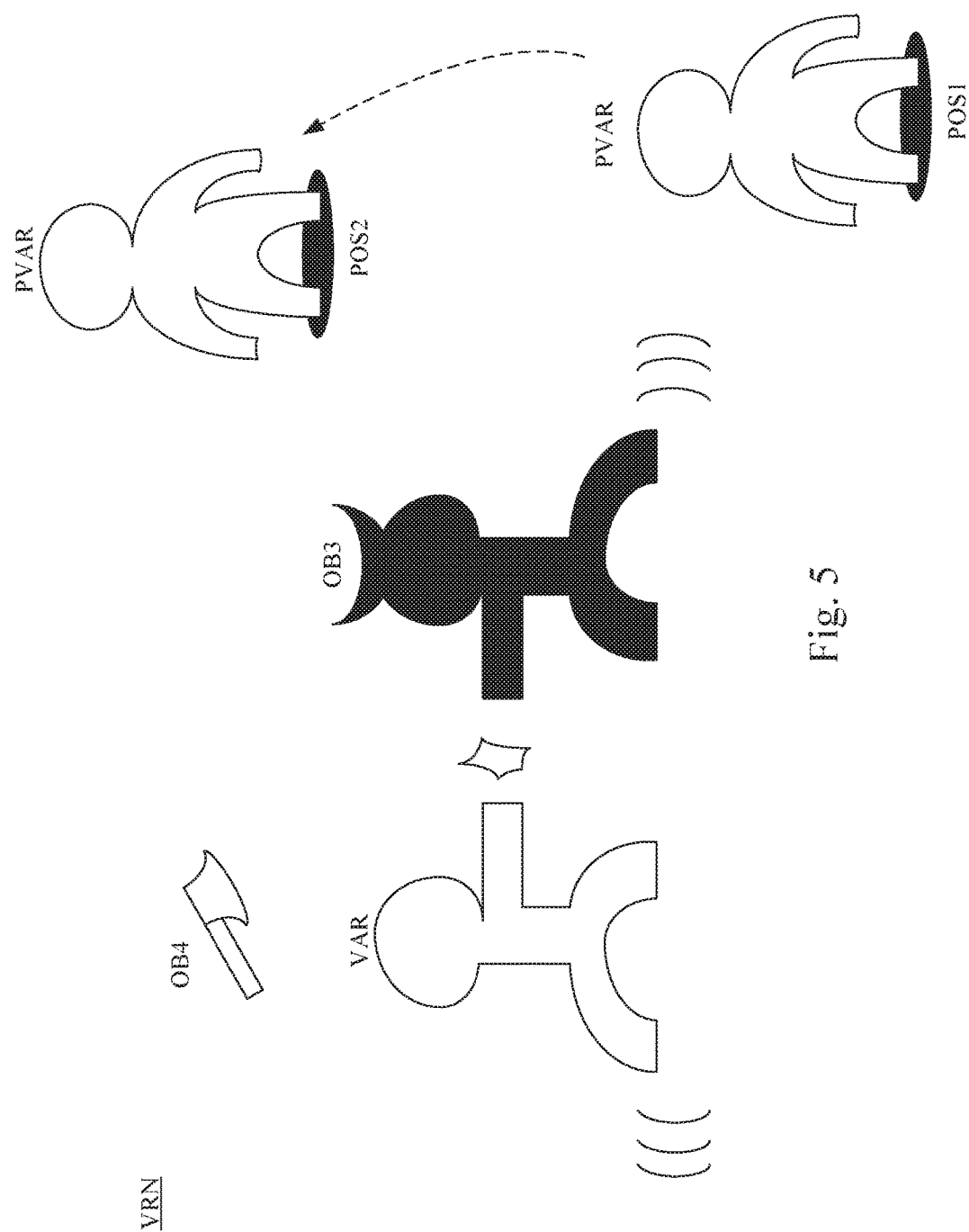
FIG. 5 illustrates an illustrative example of the VR system in accordance with one embodiment of the present disclosure.

FIG. 5 illustrates an illustrative example of the VR system in accordance with one embodiment of the present disclosure. In this example, in a first period (e.g., $5^{th}$-$15^{th}$ seconds), there is a VR event that the user's VR avatar VAR1 fights with a VR object OB3 (e.g., a VR character), and a VR object OB4 is positioned beneath the user's VR avatar VAR1 in the VR environment VRN. This VR event is recorded and afterward redisplayed in a second period (e.g., in the $25^{th}$-$30^{th}$ seconds).

In the second period, the present user avatar PVAR is at the VR position POS1, and the VR display device 130 redisplays the recorded actions of the past user's VR avatar VAR1 and the recorded actions of the VR object OB3 in the VR event in the view of the VR position POS1.

In the second period, in the observer mode, the present user's VR avatar PVAR can move to another VR position (e.g., the VR position POS2) to watch the redisplayed event in the view of the another VR position.

On the other hand, in the interacting mode, in addition to moving around, the present user's VR avatar PVAR can pick up the VR object OB4 (e.g., change one or more position parameters thereof), attack the VR object OB3 (e.g., change one or more statue parameters (e.g., health parameters) thereof), and/or attack the past user's VR avatar VAR1 (e.g., change one or more statue parameters (e.g., health parameters) thereof). Similarly, the recorded motions of the past user's VR avatar VAR1 and/or the recorded motions of the VR object OB3 in the VR event may also damage the present user's VR avatar PVAR (e.g., change one or more statue parameters (e.g., health parameters) thereof).

In one embodiment, in the interacting mode, the one or more processing components 110 may also change the recorded motions of the past user's VR avatar VAR1 and/or the recorded motions of the VR object OB3 corresponding to a movement of the present user's VR avatar PVAR corresponding to the past user's VR avatar VAR1 and/or the VR object OB3. For example, when the present user's VR avatar PVAR swings at the VR object OB3, the VR object OB3 may defend this attack, instead of continuously fighting with the past user's VR avatar VAR1 as recorded.

Details of the present disclosure are described in the paragraphs below with reference to a method for VR in FIG. 6. However, the present disclosure is not limited to the embodiment below.

It should be noted that the method can be applied to a VR processing device 100 having a structure that is the same as or similar to the structure of the VR processing device 100 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

It should be noted that, in some embodiments, the method may be implemented as a computer program. When the computer program is executed by a computer, an electronic device, or the one or more processing components 110 in FIG. 1, this executing device performs the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Figure 6:
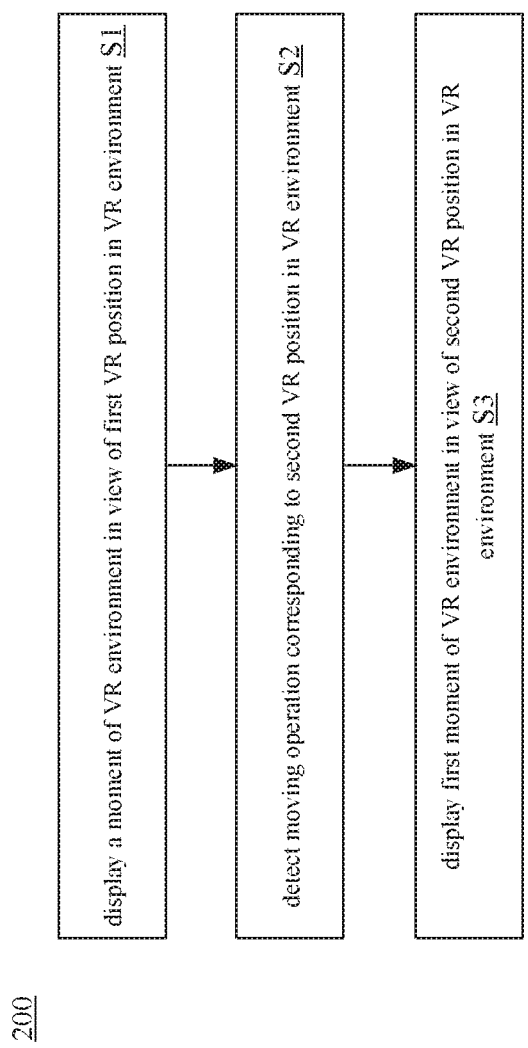
FIG. 6 is a flowchart of a method in accordance with one embodiment of the present disclosure.

Reference is made to FIGS. 1 and 6. The method 200 includes the operations below.

In operation S1, the one or more processing components 110 control the VR display device 130 to display a moment of a VR environment in a view of a first VR position in the VR environment. In one embodiment, a user's VR avatar is at the first VR position in the VR environment at the moment. In one embodiment, the moment of the VR environment may be the frozen moment or the captured moment described above, and details in this regard can be ascertained with the paragraphs above.

In operation S2, the one or more processing components 110 detect a moving operation corresponding to a second VR position in the VR environment.

In operation S3, the one or more processing components 110 control the VR display device 130 to display the moment of the VR environment in a view of a second VR position in the VR environment.

Details of this method can be ascertained with reference to the paragraphs above, and a description in this regard will not be repeated herein.

Through the operations of one embodiment described above, a function for freezing the VR environment and/or a function for capture a global VR image can be implemented.

Details of the present disclosure are described in the paragraphs below with reference to another method for VR in FIG. 7. However, the present disclosure is not limited to the embodiment below.

It should be noted that the method can be applied to a VR processing device 100 having a structure that is the same as or similar to the structure of the VR processing device 100 shown in FIG. 1. To simplify the description below, the embodiment shown in FIG. 1 will be used as an example to describe the method according to an embodiment of the present disclosure. However, the present disclosure is not limited to application to the embodiment shown in FIG. 1.

It should be noted that, in some embodiments, the method may be implemented as a computer program. When the computer program is executed by a computer, an electronic device, or the one or more processing components 110 in FIG. 1, this executing device performs the method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Figure 7:
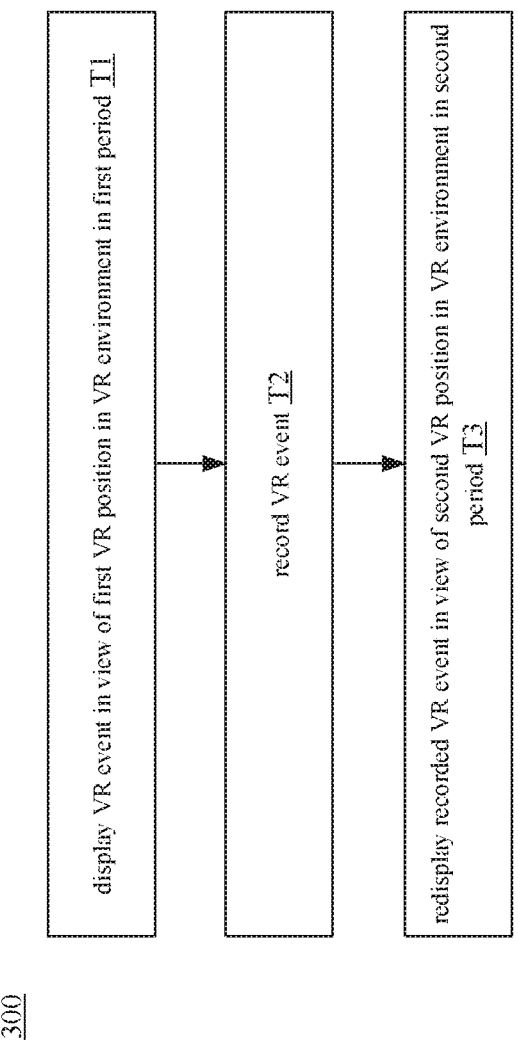
FIG. 7 is a flowchart of a method in accordance with one embodiment of the present disclosure.

Reference is made to FIGS. 1 and 7. The method 300 includes the operations below.

In operation T1, the one or more processing components 110 control the VR display device 130 to display a VR event in a view of a first VR position in a VR environment in a first period. In one embodiment, a user's VR avatar is at the first VR position in the first period.

In operation T2, the one or more processing components 110 record the VR event.

In operation T3, the one or more processing components 110 control the VR display device 130 to redisplay the recorded VR event in a view of a second VR position in the VR environment in a second period. In one embodiment, the present user's VR avatar is at the second VR position while the past user's VR avatar is redisplayed at the first VR position.

Details of this method can be ascertained with reference to the paragraphs above, and a description in this regard will not be repeated herein.

Through the operations of one embodiment described above, a user can watch a past VR event again in a view of a different VR position.

Although the present invention has been described in considerable detail with reference to certain embodiments thereof, other embodiments are possible. Therefore, the scope of the appended claims should not be limited to the description of the embodiments contained herein.

What is claimed is:

1. A method for virtual reality (VR) comprising:
    displaying a VR event in a view of a first VR position in a VR environment in a first period, wherein a user's first VR avatar is at the first VR position in the first period;
    recording the VR event;
    redisplaying the recorded VR event in a view of a second VR position in the VR environment in a second period;
    generating a user's second VR avatar in the second period, wherein the user's second VR avatar is different from the user's first VR avatar in the recorded VR event;
    detecting a motion of the user's second VR avatar in the second period;
    changing at least one parameter of the user's first VR avatar or an object in the recorded VR event according to the motion of the user's second VR avatar;
    detecting a motion of the user's first VR avatar or a motion of the object in the second period; and
    changing at least one parameter of the user's second VR avatar according to the motion of the user's first VR avatar or the motion of the object.

2. The method as claimed in claim 1, wherein the user's second VR avatar is at the second VR position in the second period.

3. The method as claimed in claim 1 further comprising:
    recording one or more motions of a VR object in the VR event in the first period; and
    redisplaying the recorded motions of the VR object in the VR event in the view of the second VR position in the second period.

4. The method as claimed in claim 1 further comprising:
    changing at least one parameter of a VR object in the recorded VR event corresponding to a movement of either of the user's first VR avatar or the user's second VR avatar in the second period.

5. The method as claimed in claim 1 further comprising:
    recording one or more motions of the user's first VR avatar at the first VR position in the VR event in the first period; and
    redisplaying the recorded motions of the user's first VR avatar in the VR event in the view of the second VR position in the second period.

6. The method as claimed in claim 1 further comprising:
    freezing a moment of the redisplayed VR event in the second period;
    detecting a moving operation corresponding to a third VR position in the frozen moment of the redisplayed VR event; and
    displaying the frozen moment of the redisplayed VR event in a view of the third VR position in the VR environment.

7. The method as claimed in claim 1 further comprising:
    capturing a moment of the redisplayed VR event in the second period that stores information of the moment of the redisplayed VR event;
    retrieving the stored information of corresponding to the captured moment of the redisplayed VR event;
    detecting a moving operation corresponding to a third VR position in the captured moment of the redisplayed VR event; and
    displaying the captured moment of the redisplayed VR event in a view of the third VR position in the VR environment.

8. A virtual reality (VR) device comprising:
    a VR display device;
    one or more processing components electrically connected to the VR display device;
    memory electrically connected to the one or more processing components; and
    one or more programs, wherein the one or more programs are stored in the memory and configured to be executed by the one or more processing components, the one or more programs comprising instructions for:

controlling the VR display device for displaying a VR event in a view of a first VR position in a VR environment in a first period, wherein a user's first VR avatar is at the first VR position in the first period;

recording the VR event;

controlling the VR display device for redisplaying the recorded VR event in a view of a second VR position in the VR environment in a second period;

generating a user's second VR avatar in the second period, wherein the user's second VR avatar is different from the user's first VR avatar in the recorded VR event;

detecting a motion of the user's second VR avatar in the second period;

changing at least one parameter of the user's first VR avatar or an object in the recorded VR event according to the motion of the user's second VR avatar;

detecting a motion of the user's first VR avatar or a motion of the object in the second period; and changing at least one parameter of the user's second VR avatar according to the motion of the user's first VR avatar or the motion of the object.

9. The VR device as claimed in claim 8, wherein the user's second VR avatar is at the second VR position in the second period.

10. The VR device as claimed in claim 8 further comprising instructions for:

recording one or more motions of a VR object in the VR event in the first period; and controlling the VR display device for redisplaying the recorded motions of the VR object in the VR event in the view of the second VR position in the second period.

11. The VR device as claimed in claim 8 further comprising instructions for:

changing at least one parameter of a VR object in the recorded VR event corresponding to a movement of either of the user's first VR avatar or the user's second VR avatar in the second period.

12. The VR device as claimed in claim 8 further comprising instructions for:

recording one or more motions of the user's first VR avatar at the first VR position in the VR event in the first period; and controlling the VR display device for redisplaying the recorded motions of the user's first VR avatar in the VR event in the view of the second VR position in the second period.

13. The VR device as claimed in claim 8 further comprising instructions for:

freezing a moment of the redisplayed VR event in the second period;

detecting a moving operation corresponding to a third VR position in the frozen moment of the redisplayed VR event; and controlling the VR display device for displaying the frozen moment of the redisplayed VR event in a view of the third VR position in the VR environment.

14. The VR device as claimed in claim 8 further comprising instructions for:

capturing a moment of the redisplayed VR event in the second period that stores information of the moment of the redisplayed VR event;

retrieving the stored information of corresponding to the captured moment of the redisplayed VR event;

detecting a moving operation corresponding to a third VR position in the captured moment of the redisplayed VR event; and controlling the VR display device for displaying the captured moment of the redisplayed VR event in a view of the third VR position in the VR environment.

15. A virtual reality (VR) device comprising:

a VR display device;

one or more processing components electrically connected to the VR display device;

memory electrically connected to the one or more processing components; and one or more programs, wherein the one or more programs are stored in the memory and configured to be executed by the one or more processing components, the one or more programs comprising instructions for:

controlling the VR display device for displaying a first moment of a VR environment in a view of a first VR position in the VR environment, wherein at the first moment a user's first VR avatar is at the first VR position in the VR environment;

detecting a moving operation corresponding to a second VR position in the VR environment;

at second moment, controlling the VR display device for redisplaying the first moment of the VR environment in a view of the second VR position in the VR environment;

at second moment, generating a user's second VR avatar in the first moment of the VR environment, wherein the user's second VR avatar is different from the user's first VR avatar;

at second moment, detecting a motion of the user's second VR avatar in the VR environment;

changing at least one parameter of the user's first VR avatar or an object in the first moment of the VR environment according to the motion of the user's second VR avatar;

detecting a motion of the user's first VR avatar or a motion of the object; and changing at least one parameter of the user's second VR avatar according to the motion of the user's first VR avatar or the motion of the object.

16. The VR device as claimed in claim 15 further comprising instructions for:

moving the user's first VR avatar or a ghost of the user's first VR avatar of the first moment of the VR environment in response to the moving operation; and changing one or more of parameters of a VR object of the first moment of the VR environment in response to a movement of the user's first VR avatar or the ghost of the user's first VR avatar.

17. The VR device as claimed in claim 15 further comprising instructions for:

before detecting the moving operation, freezing the VR environment at the first moment; and unfreezing the VR environment after controlling the VR display device for redisplaying the first moment of the frozen VR environment in the view of the second VR position.

18. The VR device as claimed in claim 15 further comprising instructions for:

capturing the first moment of the VR environment that stores information of the VR environment corresponding to the first moment; and retrieving the stored information of the VR environment corresponding to the first moment, in order to control the VR display device to display the first moment of the VR environment in the view of the first VR position before detecting the moving operation.

* * * * *